No. 685,923. Patented Nov. 5, 1901.
T. K. LOKEN.
HORSE DETACHER.
(Application filed Jan. 28, 1901.)
(No Model.)
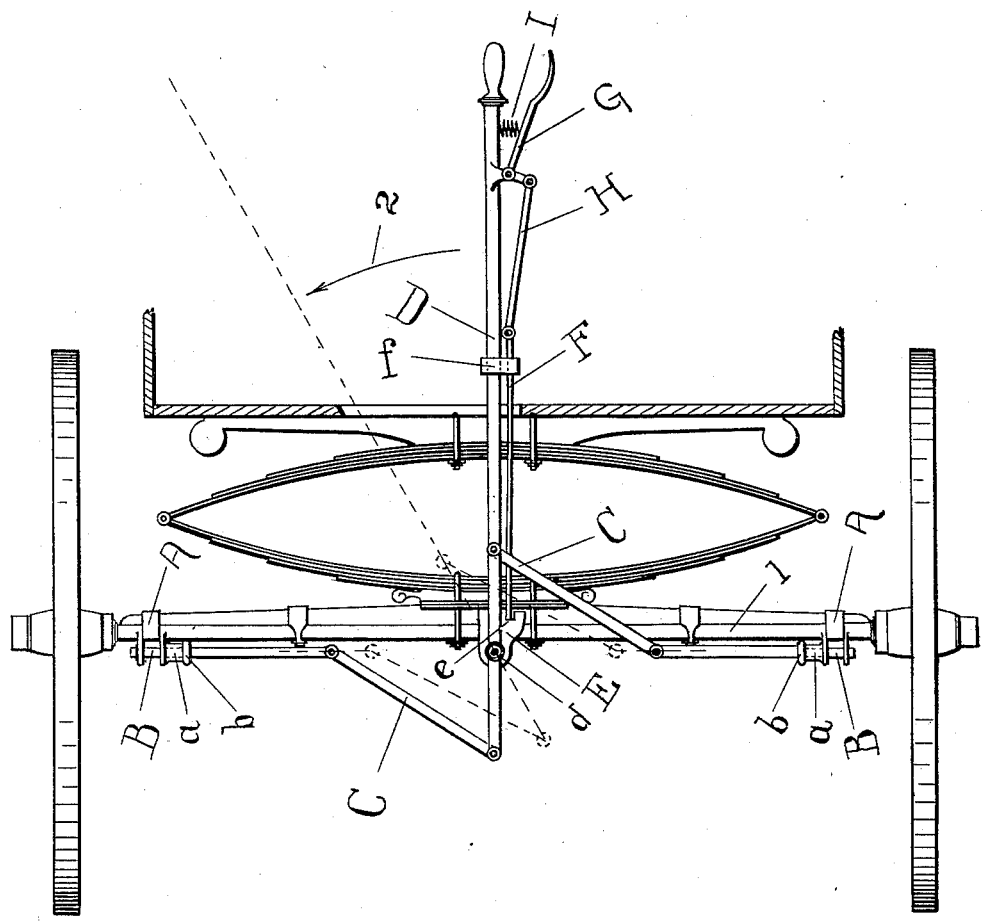
WITNESSES:
S. Harnisch
B. Paterson.
INVENTOR
T. K. Loken
BY
ATTORNEYS

UNITED STATES PATENT OFFICE.

THOM KNUTSON LOKEN, OF NORD, NORTH DAKOTA.

HORSE-DETACHER.

SPECIFICATION forming part of Letters Patent No. 685,923, dated November 5, 1901.

Application filed January 28, 1901. Serial No. 44,976. (No model.)

*To all whom it may concern:*

Be it known that I, THOM KNUTSON LOKEN, a citizen of the United States, and a resident of Nord, county of Walsh, and State of North Dakota, have invented certain new and useful Improvements in Horse-Detachers, of which the following is a specification, reference being had to the accompanying drawing, forming a part thereof, in which similar letters and numerals of reference indicate corresponding parts.

This invention relates to an improved horse and shaft detaching device for vehicles; and the object thereof is to provide an efficient means for instantaneously releasing a runaway horse from a vehicle. The device further acts as a means for attaching the shafts or a pole to the vehicle, whereby they may be readily substituted one for the other.

The invention will be hereinafter fully described, and specifically set forth in the annexed claims.

In the accompanying drawing, forming part of this specification, the invention is illustrated by a single view showing a front elevation of a vehicle having my improved device attached thereto.

In the practice of my invention I form on the inner side of each respective clip A of an ordinary vehicle sleeves a, which sleeves carry sliding bolts B, adapted to fasten the shafts or carriage-pole within the said clips. The sliding bolts B are limited in their outward movement by means of collars b, which normally bear against the inner ends of the sleeves a, and they are respectively pivotally connected to rods C, which are pivoted to a lever D, which is employed to slide the bolts. The lever D is fulcrumed at d to a hanger E, which is secured to the center of the front axle 1, and the said lever is maintained in normal vertical position by means of a bolt F, which slides within a box f, secured to the lever D, and engages a recess e of a projection E', forming part of the hanger E. This bolt is connected to an operating-lever G by means of the rod H, and the said bolt F is maintained in locked position within the recess e by means of a spiral or other suitable spring, as I.

In the operation and use of the device in order to attach the pole or shaft it is simply necessary to press the lever G against the lever D until the bolt F is released from its retaining-recess e. Then press the lever D downwardly in the direction of the arrow 2 until the outer ends of the bolts B are drawn within the sleeves a of the clips A. Then the shafts or pole may be readily put in place and the lever D pushed back into its normal position, thus effectually securing the pole or shafts. When it is desired for any purpose to remove the shafts or to release a runaway horse, it is simply necessary to repeat the above said operation of forcing the lever D downwardly in the direction of the arrow 2 to allow the horse to escape with the shafts, thus obviating liability of injury by having the horse collide with objects on the road.

I do not confine myself to the specific details of mere mechanical construction and design as herein shown and described, as it is obvious that under the scope of my invention I am entitled to slight structural variations.

Having thus described my invention, what I claim as new, and desire to secure by Letters Patent, is—

1. As a shaft and pole attaching and detaching device, for vehicles, the combination of sliding bolts, engaging the shaft and pole clips; collars formed on said clips to accommodate and guide said bolts; with a hanger formed with a notch, fastened on the axle of said vehicle; a lever pivoted on said hanger; a bolt locking said lever by engaging said notch; and rods pivotally connected with said lever, and said bolts, substantially as shown and described.

2. As a shaft and pole attaching and detaching device for vehicles, the combination with the axle of said vehicle, and the clips thereon, sliding bolts, moving in and guided by collars formed on said clips, and adapted to attach and detach the pole, and shafts of said vehicle; and a hanger, formed with a notch, fastened on said axle, of a lever, pivoted on said hanger; a locking device, as shown and described, to detain said lever in position by engaging said notch; and connecting-rods, pivotally attaching said lever to said bolts, and affording facility for moving said bolts, with the movement of said lever, substantially as shown and described.

3. As a pole and shaft, attaching and detaching device for vehicles, the combination with the axle of said vehicle, and the clips thereon; sliding bolts moving in and guided by collars formed on said clips, and adapted and arranged to attach and detach the shafts and pole of said vehicle; and a hanger formed with a notch fastened on said axle; of a lever pivoted on said hanger; connecting-rods pivotally attaching said lever to said bolts, and affording facility for actuating said bolts by moving said lever, a locking-bolt, and spring-actuated lever mechanism, for locking said bolt by engaging said notch in said hanger; substantially as shown and described.

In testimony that I claim the foregoing as my invention I have signed my name, in presence of two witnesses, this 21st day of December, 1900.

THOM KNUTSON LOKEN.

Witnesses:
ANDREW N. FOSS,
JAMES MCINTYRE.